Figure 1:
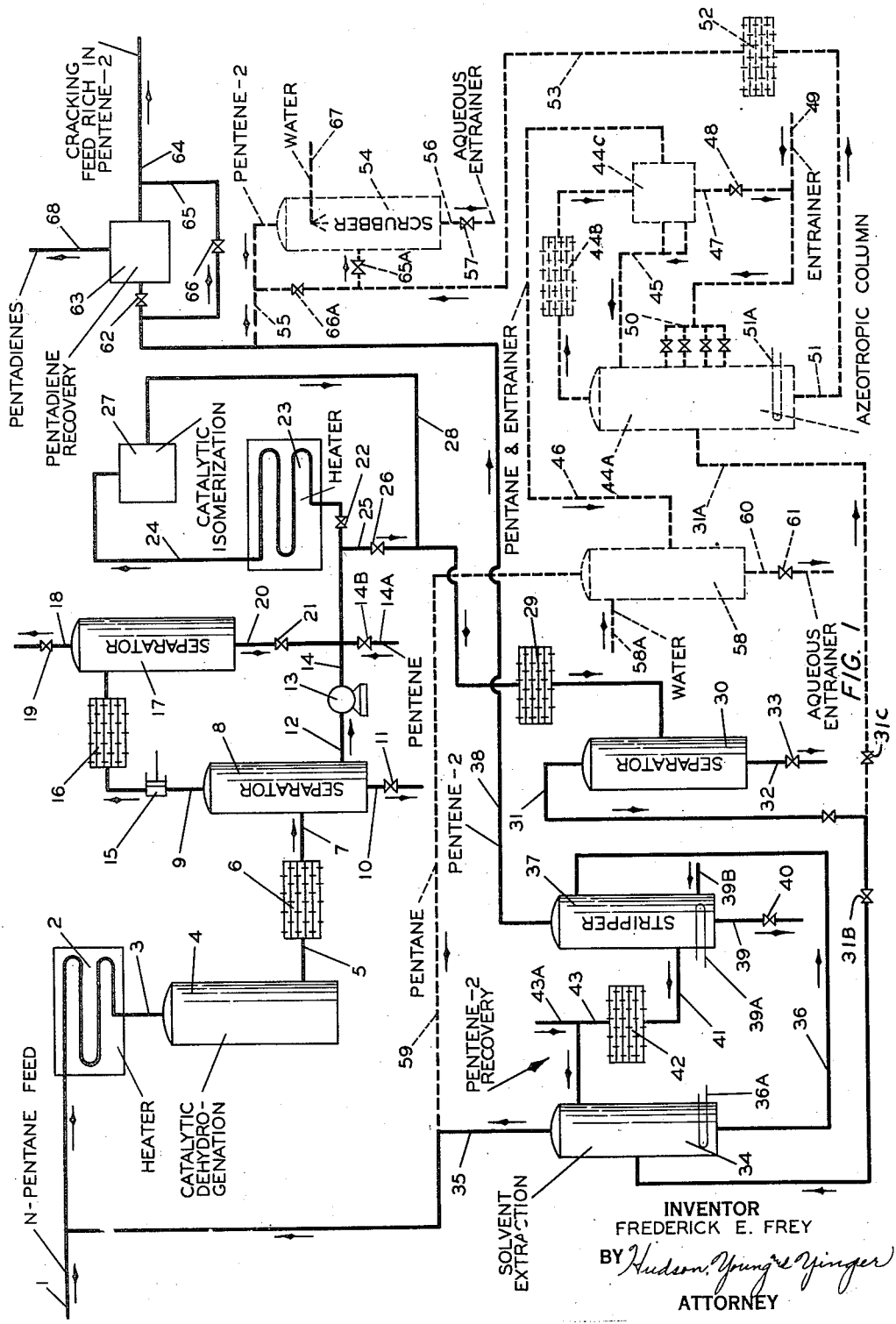

March 12, 1946. F. E. FREY 2,396,416
DIOLEFIN PREPARATION
Filed Feb. 16, 1942 2 Sheets-Sheet 2

INVENTOR
FREDERICK E. FREY
BY Hudson, Young and Yinger
ATTORNEY

Patented Mar. 12, 1946

2,396,416

UNITED STATES PATENT OFFICE 2,396,416

DIOLEFIN PREPARATION

Frederick E. Frey, Bartlesville, Okla., assignor to Phillips Petroleum Company, a corporation of Delaware Application February 16, 1942, Serial No. 431,151

2 Claims. (Cl. 260—680)

This invention relates to a process for the manufacture of diolefins. More specifically it relates to the formation of pentene-2 from n-pentane and conversion of pentene-2 to butadiene and pentadienes.

It is well known that butadiene can be formed by passing the vapors of n-pentane or the n-pentenes through a tubular reactor heated to a pyrolyzing temperature of 525 to 700° C. However, the yield of butadiene from n-pentane by such a procedure is always low. Likewise, the yield of butadiene from the n-pentenes is low, since the butadiene-forming reaction is accompanied by concurrent polymerization and hydrogenation reactions which result in the production of considerable amounts of saturated hydrocarbons and normally liquid polymers.

I have found that the yield of butadiene is materially improved when the pyrolysis is conducted at temperatures above 700° C., and the degree of pyrolysis limited by controlling the time of heating, so that not more than about 10 per cent by weight of polymers boiling above about 50° C. is present in the products from the conversion zone. The amount of pentene reacted per passage through the heating zone may be increased, with consequent reduction of pentene recycle, without encountering excessive loss to polymers, by conducting the pyrolysis at subatmospheric pressure, or by reducing the partial pressure of the pentene by the use of diluents such as steam, flue-gas, methane, and the like.

Higher yields of butadiene are obtained from pentene-2 than from pentene-1. This effect may be linked with the higher thermal decomposition rate of 1-olefins at the same temperature, and the somewhat greater tendency of 1-olefins to break near the center of the molecule.

Under the conditions outlined above, pentadienes are also formed in the pyrolysis of pentene-2. This has not been previously reported, so far as I am aware.

The objects of my invention are:

1. To provide a process for the manufacture of butadiene and pentadienes from n-pentane.

2. To convert a hydrocarbon mixture rich in pentene-2 to butadiene and pentadienes by a thermal process.

3. To provide a combination process for the manufacture of diolefins by catalytically dehydrogenating n-pentane, separating therefrom an olefin concentrate rich in pentene-2, pyrolyzing this concentrate to produce diolefins, recovering the diolefins and recycling unconverted amylenes to the pyrolysis step.

Other objects of my invention will be apparent from the following detailed description.

The economical and efficient production of aliphatic conjugated diolefins, particularly butadiene and pentadienes such as isoprene and piperylene, has been a matter of great importance since these diolefins are valuable raw materials for synthetic rubber production. As far as I am aware the production of these diolefins from hydrocarbons of petroleum origin has not to date been entirely satisfactorily accomplished.

In accordance with my invention this problem is solved by the use of n-pentane, a readily available refinery raw material, as the starting material. The n-pentane is first dehydrogenated catalytically to form an effluent containing a substantial proportion of pentene-2.

The $C_5$ portion of the effluent may optionally now be subjected to catalytic isomerization to convert pentene-1 to pentene-2 and thereby further increase the content of pentene-2.

The pentene-2 content may then be separated from any other products. Desirably this is accomplished by selective solvent extraction with a polar solvent exerting a selective solvent power upon pentene-2 in preference to other compounds such as other pentenes. Upon stripping of the solvent a cracking feed comprising preponderantly and preferably consisting entirely of pentene-2 is obtained.

The pentene-2 may now be cracked under conditions such as to form butadiene and pentadienes, the former usually preponderating in the total aliphatic conjugated diolefin content of the effluent. The diolefins are then recovered from the effluent in any suitable manner.

My invention comprehends the discovery that pentene-2 is uniquely converted to butadiene while pentene-1 is not as readily transformed to butadiene. While pentene-1, upon cracking under the same conditions as pentene-2, gives some butadiene it does not give nearly as much. My invention also comprehends the discoveries that dehydrogenation of normal pentane gives a material uniquely suited for cracking to butadiene, because rich in pentene-2, and especially suited for solvent extraction to remove the desirable pentene-2 content preferentially, and that the selective solvent extracted portion is still more uniquely suited for cracking to form butadiene and pentadienes. The invention also comprehends the discovery that the dehydrogenation effluent may be rendered still more suitable for selective solvent extraction and cracking to diolefins, by subjecting it to catalytic isomerization to increase further the pentene-2 content at the expense of the less desirable pentene-1.

My invention still further comprehends the discovery of what I believe to be new conditions in carrying out cracking of pentene-2 to diolefins. The cracking feed rich in pentene-2 may be derived from any source, preferably through the route described above and hereinafter.

The cracking conditions may involve temperatures above 700° C. up to 900° C. and preferably between about 750° C. and about 850° C. The time of heating may be such as to effect from about 20 to about 80% decomposition of the pentene-2 content of the feed per pass. In general the time will be between about 0.001 and about 5 seconds, and preferably between about 0.01 and about 0.1 second. Pressures ranging from about 0.1 to about 2 atmospheres and preferably substantially atmospheric may be used.

By proceeding in the manner described herein, I am able to produce unexpectedly high yields of desirable olefins from economically available raw materials. The operation is simple, economical and efficient. These results may be attributed to the unique combination of the several steps described and to the conditions under which the cracking step is carried out. My invention in its more specific aspect involves the combination of several steps in a new and peculiarly effective relationship, since the dehydrogenation, the isomerization, and the selective solvent extraction are all designed and carried out so as to give a better feed to the cracking step.

Instead of solvent extraction, I may less preferably use azeotropic distillation for preparing the pentene-2 concentrate for the cracking feed. Thus an entraining agent capable of forming an azeotrope with n-pentane lower boiling than pentene-2 may be introduced, whereby the azeotrope passes overhead and pentene-2 rich material goes out as a bottom product.

The pentadienes described herein comprise largely the piperylenes, although some cyclopentadiene may be formed. Also some isoprene frequently is formed. The diolefin content of the cracking effluent comprises preponderantly butadiene, however. As will be understood, the aliphatic conjugated diolefins are the most desired products of my invention.

The action of the polar solvent is to selectively dissolve olefins away from paraffins and to selectively dissolve the high-boiling pentenes (which consist substantially of pentene-2 in this case) from the other pentenes which boil at a lower temperature, such as pentene-1, unsymmetrical amylene, or isopropylethylene (very rarely encountered).

Briefly, my invention comprises preparing a concentrate rich in pentene-2, as, for example, by separating pentene-2 from the products of the catalytic dehydrogenation of n-pentane, or refinery pentane, pentenes, or other sources and subjecting this concentrate to pyrolysis, preferably in the presence of diluents, such as steam and the like, at temperatures above 700° C. with the time of heating so regulated that excessive decomposition of the pentene-2 is avoided, recycling unconverted pentene-2, and recovering butadiene and pentadienes.

Figure 2:
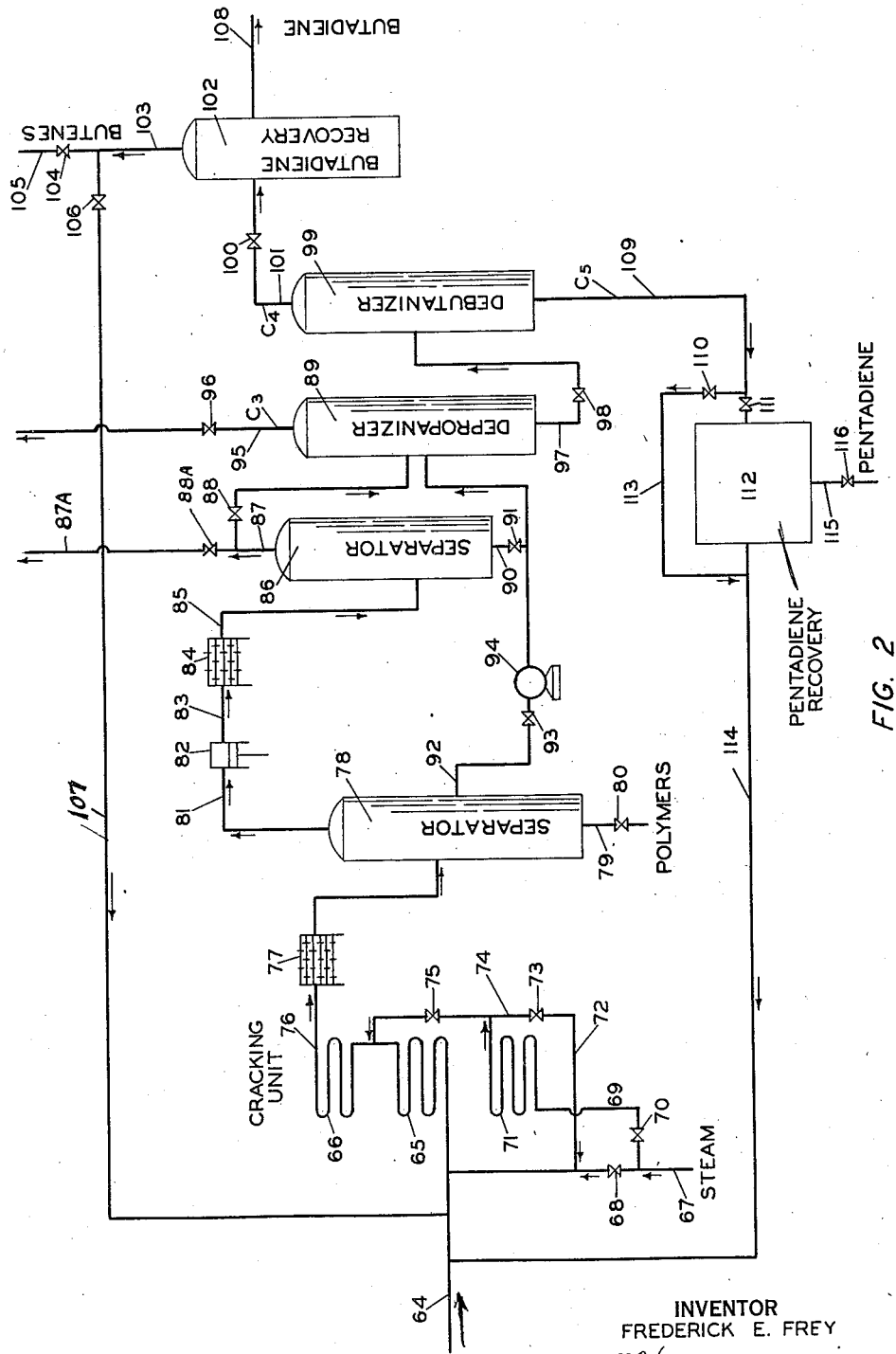

In Figure 1 is shown a diagrammatic flow sheet of a process for preparing a pentene-2 concentrate either from the products of the catalytic dehydrogenation of n-pentane, or from other stocks containing pentene-1 and pentene-2. Alternative solvent extraction and azeotropic distillation means are shown. Figure 2 is a diagrammatic flow sheet of a process for pyrolyzing the pentene-2 concentrate and recovering the butadiene and pentadienes thereby formed.

Referring to Figure 1, n-pentane enters the system through pipe 1. Unconverted pentane separated at a later stage in the process enters pipe 1 through pipe 35. The combined streams enter heater 2, where they are heated to a temperature in the range of from about 400° to about 750° C., the time of heating being kept short to avoid thermal cracking, then pass through pipe 3 to catalyst case 4, which contains a dehydrogenation catalyst such as unglowed chromium oxide, mixed chromic oxide and alumina, bauxite, or the like. The catalyst case 4 may be of any efficient design, as for example, a bundle of vertical tubes connected at each end to a common header, containing catalyst in the tubes, which may be heated by any convenient means. Several of these cases may be used; one set being regenerated during the dehydrogenation cycle of the other set. Or the catalyst chamber may be of the type where the catalyst is caused to move countercurrent to the hydrocarbon stream being dehydrogenated, or concurrently with the stream.

The products from the dehydrogenation chamber pass through pipe 5, cooler 6 and pipe 7 to separator 8. Chamber 8 may be operated in some cases at such temperature that high boiling products only are condensed, and these may be removed through pipe 10, which is controlled by valve 11. In other cases it may be desirable to allow pentanes and lighter products to condense in 8, in which case the condensate may flow through pipe 12 and pump 13. The uncondensed vapors pass through pipe 9 to compressor 15, cooler 16 to separator 17. The pentanes and other hydrocarbons contained in the vapor stream from separator 8 may be recovered from the hydrogen, either by compressing to high enough pressure, with cooling, so that pentane-pentene losses are negligible, or, they may be compressed to a lower pressure, and pentane-pentenes recovered from uncondensed vapors by the use of oil absorption. This latter is not shown on the diagram. Accordingly, uncondensed vapors from separator 17, may pass through pipe 18 and valve 19 to additional recovery steps not shown, or be vented. The liquid condensate together with any pentane-pentenes recovered in the auxiliary recovery steps, pass through pipe 20 and valve 21 to pipe 14.

Pentene-1, pentene-2 from other sources, as for example from cracked gasoline may enter the system through pipe 14a, which is controlled by valve 14b. The stream may pass through valve 22 to heater 23, where the temperature is raised to from about 150° to about 350° C., through pipe 24 to catalyst chamber 27 where pentene-1 is isomerized to pentene-2 by passing it over an acidic catalyst, as, for example, supported phosphoric acid, aluminum sulphate, or the like. The effluents from chamber 27 will contain pentene-1 and pentene-2 in the ratio of about 1 to 10. In some cases it may be desirable to omit the isomerization step entirely or to subject only a portion of the stream to this treatment. This may be done by suitable manipulation of valves 22 and 26, allowing any desired proportion of the stream to flow through pipe 25 and valve 26. The stream passes through cooler 29 to separator 30 where any high-boiling products are separated and withdrawn from the system through pipe 32, controlled by valve 33.

The pentenes may be separated from unconverted pentane either by solvent extraction or azeotropic distillation. I have shown a solvent extraction system in solid lines, and an azeotropic distillation system in dotted lines. I shall first describe the solvent extraction system. The uncondensed vapors from separator 30 pass through pipe 31 and valve 31b to absorber 34. Absorbent such as furfural, levulinic acid, dimethyl formamide, furfuryl alcohol, phenol-water or the like enters 34 through pipe 43. Make-up solvent enters through pipe 43a. Heat is applied at the bottom of 34 by means of heating coil 36a. Unabsorbed vapors, which consist largely of unconverted pentane pass through pipe 35 and are recycled to the dehydrogenation step. The enriched absorbent passes through pipe 36 to stripping tower 37 where the absorbed hydrocarbons are vaporized and pass through pipe 38. Heat is applied by means of heating coil 39a. Steam or other vapors may be introduced through pipe 39b to aid in the stripping. The stripped solvent is passed through pipe 41 and cooler 42 to the absorber 34. Absorbent may also be removed through pipe 39, controlled by valve 40, if desired, for cleaning.

If azeotropic distillation is employed to recover the pentenes, the system shown by the dotted lines is used. Uncondensed vapors from separator 30 pass through pipe 31a and valve 31c to fractionating column 44a equipped with reflux cooler 44b and reflux accumulator 44c. Entrainer enters the column through pipe 49 and manifold 50, and may be added at one or more points along the column. Entrainers such as acetaldehyde, propionaldehyde, propylene oxide and the like may be employed. Fractionation is conducted in the usual manner, heat being applied by means of heating coil 51a. The overhead product, consisting largely of pentane and entrainer, passes through condenser 44b to accumulator 44c. In some cases a portion of the entrainer will separate out as a separate phase in 44c. When this occurs, proportioning pumps are used to return the proper amount of each phase to the column 44a and through pipe 45. Likewise, when phase separation occurs, excess entrainer phase may be returned to 44a by means of pipe 47 and valve 48 and pipe 49. Make-up entrainer may be added through pipe 49. Pentane containing dissolved entrainer is passed through pipe 46 to tower 58, where entrainer is removed by scrubbing with water or other suitable solvent introduced through pipe 58a. Pentanes free of entrainer pass through pipe 59 and are recycled to the dehydrogenation step by means of pipe 35. The flow of entrainer to 44a may, in some cases, be adjusted so that the kettle product is free of entrainer. In other cases, this will not be economical. Accordingly, the olefinic kettle product passes through pipe 51 and cooler 52, through valve 65a to tower 54, where entrainer is scrubbed out with water or other suitable solvent introduced through pipe 67. If desired, the scrubber 54 may be by-passed by suitable adjustment of valves 65a and 66a. Entrainer and solvent may be removed through pipe 56 and valve 57, and from 58 through pipe 60 and valve 61. The recovered olefins pass through pipe 55.

The recovered olefins passing through pipe 55 or 38 may be passed through line 65, valve 66, and pipe 64 directly to the pyrolysis unit described in Figure 2. However, in some cases, particularly when the catalytic dehydrogenation is conducted at high temperature, or in the presence of steam or other diluents, pentadienes may be present in amount sufficient to warrant recovering them. The pentadienes may be separated from the other $C_5$ hydrocarbons present by any one of several methods indicated generally in Figure 1 by separation step 63. Thus, the recovered olefins may be reacted with $SO_2$ in the dense phase at temperatures in the range of 100° to 150° C., the monosulfone formed being separated and subsequently decomposed by heat to recover the diolefin. Or the separation may be made by solvent extraction or azeotropic distillation as previously outlined, or frequently simple fractionation may be employed. The olefin stream enters separation step through valve 62. Diolefins pass through pipe 68, and the pentene-2 olefin stream passes through pipe 64 to the pyrolysis step of Figure 2.

The cracking system as shown in Figure 2 will now be described. The pentene-2 concentrate from pipe 64 is passed to a heating system, which is herein represented by a convection coil, 65, and a radiation coil, 66. Steam or other stable, volatile diluent may be added to the charge stock; from pipe 67, steam, etc., may pass through valve 68 directly to the convection coil of the furnace or it may pass from pipe 67 through pipe 69, controlled by valve 70, to a separate heating coil, 71, and thence through pipe 72, by means of valve 73, to the convection coil of the furnace or through pipe 74, controlled by valve 75, to a radiation coil of the furnace. The charge stock is cracked in the furnace at temperatures in the range above 700 to 900° C. The heating time varies inversely with the temperature, decreasing as the temperature rises, and is adjusted to effect 20 to 80% decomposition of the pentene-2 per pass through the heating zone. The decomposition should be maintained in the lower part of the range when no diluent is used, or when the partial pressure of the amylenes is near or slightly above atmospheric pressure. The higher conversions may be employed when the pyrolysis is conducted at pressures below atmospheric, or when diluents such as steam are employed.

The effluents from the cracking step are passed from the furnace through pipe 76 to cooler 77; the cooled effluents are passed to separation step 78. Polymers and water from the cracking step are withdrawn from the bottom of the separating column through pipe 79 by means of valve 80. The gases pass overhead through pipe 81, to compressor 82, through pipe 83 to cooler 84 and through pipe 85 to separator 86. From the separator, gases pass overhead through pipe 87, controlled by valve 88, to a depropanizing column, 89; the liquid products in the separator pass from the bottom of the column through pipe 90, controlled by valve 91, to pipe 92 and join the stream of any liquid products from separation step 78 which are being passed through pipe 92, controlled by valve 93 and pump 94 to the depropanizer. From the depropanizer, which is the conventional type, propane and lighter gases are separated overhead and are withdrawn from the system through pipe 95, controlled by valve 96. Alternatively, if desired, gases may pass from separator 86 through pipe 87a controlled by valve 88a to recovery means, not shown, wherefrom $C_4$ and heavier hydrocarbons may be recovered and returned to the system.

The kettle product from the depropanizer passes through pipe 97, controlled by valve 98, to a debutanizer, 99. In this unit, the $C_4$-hydrocarbons are recovered as overhead product and are passed through pipe 101, controlled by valve 100, to a separation step 102 where butadiene is separated from other C₄ hydrocarbons. This separation may be effected in any one of several manners. Fractional distillation may be employed wherein butene-1 and isobutylene, if present, are separated in a first step, following which butadiene is separated from butene-2. Or the separation may be performed by a single fractionating step using an entrainer such as acetaldehyde. Solvent extraction employing furfural or other selective solvents is an especially efficient method for separating butadiene of high purity.

Butadiene may also be separated and recovered by reacting the C₄ hydrocarbons with sulfur dioxide. The butadiene monosulfone thereby formed may be separated from the unreacted products by decantation and/or distillation, and the diolefin regenerated by heating the monosulfone to temperatures above about 80° C. and preferably above about 120° C. The reaction between diolefins and sulfur dioxide may suitably be conducted in the dense phase at temperatures in the range of 30° to 180° C., and preferably in the range of 100° to 150° C. Inhibitors such as pyrogallol, phenyl-beta-naphthylamine may be employed in the low temperature range to avoid the formation of insoluble refractory polysulfones which do not regenerate the diolefin readily, but inhibitors are not necessary at temperatures above about 100° C., as polysulfones are formed only in small amount, if at all, at these temperatures. The time required to complete the sulfone reaction varies inversely with the temperature, from several days at 30° C. to about ½ to 2 hours at 150° C. The sulfur dioxide used may be in the range of about 2 to 20 moles per mole of diolefin. The reaction is kinetically of the second order, and the time required is decreased as the amount of sulfur dioxide and/or diolefin is increased.

The separated butenes pass through pipe 103 and may be vented or recycled to the pyrolysis in any desired proportion through lines 105 and 107 by suitable adjustment of valves 104 and 106.

The kettle product from debutanizer 99 passes through pipe 109 and valve 111 to separation step 112 where diolefins are separated and removed from the system through pipe 115 and valve 116. This separation may be effected by fractionation, azeotropic fractionation, solvent extraction or sulfone formation as described for the butadiene separation. In some cases it may not be desirable to separate the pentadienes, or only part of the stream may be so treated. Accordingly, a portion or all of the stream from the debutanizer may flow through valve 110 and pipe 113. Recycle C₅ hydrocarbons are returned to the pyrolysis step through pipe 114.

The following example is cited for purposes of illustration only to show about the yield of products obtained from pentene-2 when pyrolyzed under conditions as disclosed in my invention.

| | | |
|---|---|---|
| Average temp | 760° C. | 777° C. |
| Time, sec | 0.1005 | 0.01532 |
| Total pressure, mm. Hg | 745 | 745 |
| Quantity charge, mole per cent: | | |
|   Pentene-2 | 100 | 32.5 |
|   Steam | 0 | 67.5 |
| Per cent pentene-2 cracked | 73.22 | 36.23 |
| H/C ratio of products | 1.99 | 1.977 |
| Reaction velocity constant | 13.1 | 29.35 |

| | Weight percent | Weight percent |
|---|---|---|
| Composition of products: | | |
|   H₂ | 0.22 | 0.11 |
|   CO | 0.14 | 0.06 |
|   CO₂ | 0 | 0 |
|   CH₄ | 10.33 | 4.32 |
|   C₂H₂ | 0.19 | 0.09 |
|   C₂H₄ | 4.71 | 2.26 |
|   C₂H₆ | 2.38 | 1.06 |
|   C₃H₆ | 6.88 | 2.66 |
|   C₃H₈ | 0.39 | 0.31 |
|   C₄H₆ | 18.70 | 12.33 |
|   i-C₄H₈ | 0 | 5.26 |
|   n-C₄H₈ | 10.27 | |
|   C₄H₁₀ | 0 | 0 |
|   (4-24° C.)—M. W., 70 | | 2.06 |
|   Pentadienes | 7.58 | 2.30 |
|   Pentene-2 | 26.78 | 63.77 |
|   C₅H₁₂ | 0.27 | 0 |
|   52° C.—M. W., 80 | 9.78 | 3.41 |
|   Heavies—M. W., 120 | 1.38 | |
|   Carbon | 0 | |
| | 100.00 | 100.00 |

Pentene-2 may be cracked unusually drastically without excessive loss in C₄H₆ yield. Laboratory data showed a C₄H₆ yield of 25.6 wt. percent at 73% of the pentene-2 reacted, which only increased to 34.1% at 36 percent reacted. Deep conversion is frequently preferable. The following equation defines the reaction time broadly enough to cover the range of 20 to 70 percent cracked:

$$\log t = \frac{13{,}900}{T} - (14.85 \pm 0.37)$$

where $t$ is reaction time in seconds and $T$ is cracking temperature in degrees Kelvin.

The exact amount of decomposition selected depends upon the presence or absence of diluents. With diluents, a higher decomposition per pass may usually be employed without loss in efficiency. The amount of decomposition will also depend upon the temperature used. Thus, in the lower temperature range the extent of decomposition per pass will usually be maintained in the lower portion of the range of percent cracked.

Since this invention may be practiced otherwise than as specifically described herein, and since many modifications and variations of it will be obvious to those skilled in the art, it should not be restricted except as specified in the appended claims.

I claim:

1. A process for the production of butadiene from pentene-2 which comprises subjecting said pentene-2 to pyrolysis at an elevated temperature within the range of about 750° C. to about 850° C. at substantially atmospheric pressure for a period of time within the range of about .01 second to about .1 second sufficient to effect decomposition of from 20% to 80% of the pentene-2 per pass and thereby converting pentene-2 to butadiene as the principal product of the reaction.

2. A process for the production of butadiene from pentene-2 which comprises subjecting said pentene-2 to pyrolysis at an elevated temperature within the range of about 750° C. to about 850° C. at substantially atmospheric pressure for a period of time within the range of about .01 second to .1 second and determined by the following equation:

$$\log t = \frac{13{,}900}{T} - (14.85 \pm 0.37)$$

where $t$ is the reaction time in seconds and $T$ is the temperature in degrees Kelvin and thereby converting pentene-2 to butadiene as the principal product of the reaction.

FREDERICK E. FREY.